United States Patent
Yang

(10) Patent No.: US 7,543,786 B2
(45) Date of Patent: Jun. 9, 2009

(54) MOUNTING ASSEMBLY FOR DATA STORAGE DEVICE

(75) Inventor: Qing-Zhi Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 527 days.

(21) Appl. No.: 11/046,947

(22) Filed: Jan. 31, 2005

(65) Prior Publication Data

US 2005/0280982 A1    Dec. 22, 2005

(30) Foreign Application Priority Data

Jun. 21, 2004    (CN)    ............ 2004 2 00710252

(51) Int. Cl.
    H05K 7/12    (2006.01)
(52) U.S. Cl. ............ 248/222.51; 248/694; 248/918; 361/685
(58) Field of Classification Search ............ 248/222.51, 248/222.52, 299.1; 361/685
    See application file for complete search history.

(56) References Cited

U.S. PATENT DOCUMENTS

| | | | |
|---|---|---|---|
| 6,728,109 B1 * | 4/2004 | Wu | 361/747 |
| 6,771,496 B1 * | 8/2004 | Wu | 361/685 |
| 6,859,363 B1 * | 2/2005 | Chuang | 361/685 |
| 6,922,334 B1 * | 7/2005 | Chen | 361/681 |
| 6,927,983 B1 * | 8/2005 | Beseth et al. | 361/796 |
| 6,935,604 B2 * | 8/2005 | Chen | 248/694 |
| 6,958,909 B2 * | 10/2005 | Endo et al. | 361/695 |
| 7,038,907 B2 * | 5/2006 | Chen | 361/685 |
| 7,040,589 B2 * | 5/2006 | Wang | 248/289.11 |

FOREIGN PATENT DOCUMENTS

CN    98235030.9    11/1999

* cited by examiner

*Primary Examiner*—J. Allen Shriver
*Assistant Examiner*—Steven Marsh

(57) ABSTRACT

A mounting assembly for data storage device includes a data storage device (10) with pinholes (13), a cage (20) receiving the data storage device, a fixing member (50) and a rotating member (60). The cage defines a plurality of mounting apertures (39) corresponding to the pinholes. The fixing member movably engages with the cage by an attaching member (80) in a perpendicular direction. A plurality of pegs (59) is extended from the fixing member. The rotating member is pivotally engaged with the cage, received behind the fixing member, and comprises two rims (65) capable of pushing or releasing the fixing member. When the rotating member pushes or releases the fixing member, the pegs of the fixing member are retreated from the pinholes device or inserted into the pinholes under functions of an elastic member (70).

19 Claims, 4 Drawing Sheets

MOUNTING ASSEMBLY FOR DATA STORAGE DEVICE

CROSS-REFERENCE TO RELATED APPLICATIONS

This application is related to a U.S. patent application entitled "MOUNTING APPARATUS FOR STORAGE DEVICES", filed on Sep. 28, 2004 with the same assignee as the instant application and with application Ser. No. 10/951, 425. The disclosure of the above identified application is incorporated herein by reference.

BACKGROUND OF THE INVENTION

1. Field of the Invention

The present invention relates to a mounting assembly for a data storage device, and more particularly to a mounting assembly with a simplified configuration and convenient to use.

2. Description of Related Art

Various data storage devices are installed in electronic apparatus for communication and handling of data. Such devices include, for example, hard disk drives, floppy disk drives and Compact Disk-Read Only Memory (CD-ROM) drives. A typical mounting assembly usually utilizes a plurality of screws, directly attaching a data storage device to a computer chassis. However, screwdrivers or other detaching tooling are necessary for installation or removal of the data storage device to dismantle/mount screws in assembly or disassembly processes, which causes inconvenience and time-consuming issues.

A conventional mounting assembly is disclosed in China patent application No. 98235030.9. The mounting assembly comprises a data storage device with a pair of rails on opposite sides thereof, and a cage forming a pair of slideways corresponding to the rails on the data storage device. Each rail is fixed to the data storage device by a plurality of screws, and combines a plurality of resilient members. The data storage device with rails on both sides thereof is inserted into the cage along the slideways on sidewalls of the cage. The resilient members are squeezed between the data storage device and the sidewalls to mounting the data storage device into the cage.

However in the foregoing conventional mounting assembly, screws are used, screwdrivers or other detaching tooling are still necessary, which causes unduly inconvenience and unduly time-consuming issues in data storage device assembly or disassembly process. Moreover, the conventional fixing means is bending the resilient member to provide mounting force of the data storage device, and the data storage device cannot be hold tight in the cage. When strong vibration happens, the data storage device can be easily detached from the cage. In addition, when the resilient members deform after frequent use, touching state of the resilient members cannot be stable and statistic electricity shielding connection between the data storage device and the cage is interrupted. So a convenient mounting assembly, overcoming the problems mentioned above is desired.

SUMMARY OF THE INVENTION

Accordingly, an object of the present invention is to provide a mounting assembly for a data storage device with a simplified configuration, and convenient to use.

To achieve the above object, a mounting assembly for a data storage device defining a plurality of pinholes in a sidewall, comprises a cage, a fixing member and a rotating member. The cage is adapted for receiving the data storage device, and comprises a side plate. The side plate defines a plurality of mounting apertures corresponding to the pinholes of the data storage device. A plurality of interior tabs is inwardly extended from the side plate for supporting the data storage device. A shaft is formed on the side plate, and an arc-shaped sliding slot surrounding the shaft is defined in the side plate. A plurality of posts, each defining a screw hole at a top end, is extended from the side plate. The fixing member is movable in a direction perpendicular to the side plate and an attaching member attaches the fixing member to the side plate. An elastic member for resilient connecting the fixing member to the side plate is sandwiched between the attaching member and the fixing member. The rotating member pivotally engaged with the side plate, comprises two rims capable of pushing the fixing member to move apart from the cage. The rotating member defines a shaft hole receiving the shaft of the side plate, and forms a guiding post in close proximity of the shaft at an inner face facing the side plate. The rotating member forms an operating handle at an outer face thereof, the rims is formed around the handle in a circumferential direction. The fixing member comprises a middle plate, and two flanges respectively extend from two opposite edges of the middle plate. The middle plate defines a mounting opening for showing the operating handle, and two arc-shaped guiding slots for engaging with the rims of the rotating member. Each flange defines a fixing hole corresponding to the post of the side plate. A bended tab is formed at an end of each guiding slot of the fixing member for blocking the brims. A plurality of pegs adapted for engaging the pinholes in the data storage device extends from the one side of the fixing member. When the rotating member pushes or releases the fixing member, the pegs of the fixing member are retreated from the pinholes of the data storage device or inserted into the pinholes under functions of the elastic member.

Other objects, advantages and novel features of the present invention will be drawn from the following detailed description of preferred embodiment of the present invention with the attached drawings, in which:

DETAILED DESCRIPTION OF THE INVENTION

Figure 1:
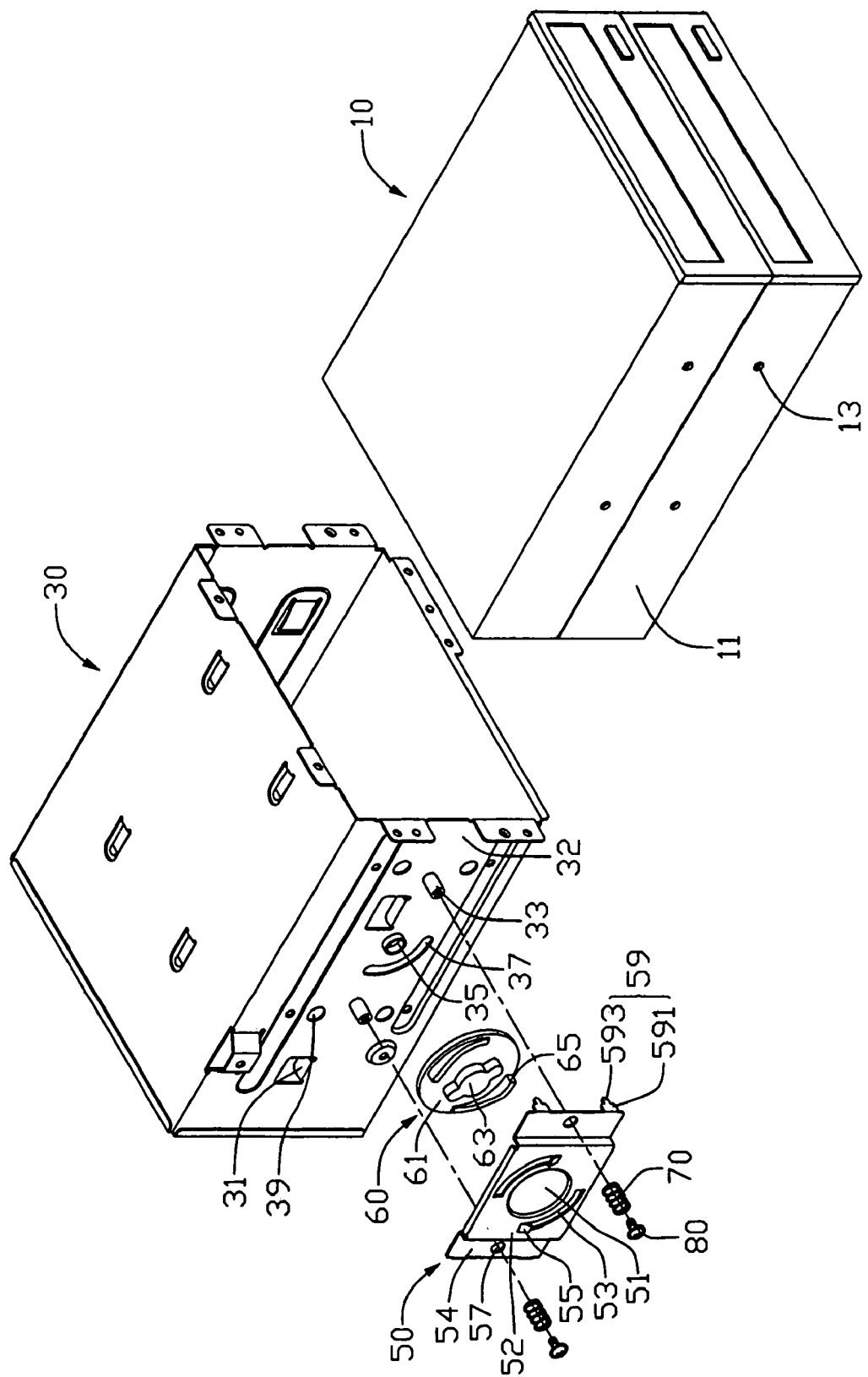
FIG. 1 is an exploded, isometric view of a mounting assembly for a data storage device in accordance with a preferred embodiment of the present invention comprising a cage, a fixing member, and a rotating member.

Referring to FIG. 1, a mounting assembly for fixing a plurality of data storage devices 10 in accordance with the preferred embodiment of the present invention comprises a cage 30 of an electronic apparatus like a computer, a fixing member 50, and a rotating member 60.

Each data storage device 10 is received in the cage 30, and two pinholes 13 are defined in a sidewall 11 therein.

The cage 30 is mounted into a computer chassis (not shown), and comprises a side plate 32. A pair of interior tabs 31 is extended inwardly from the side plate 32 to support corresponding data storage device 10. A pair of posts 33 with a screw hole (not shown) is formed at the exterior side of the side plate 32. Four round mounting apertures 39 divided into two groups, corresponding to the pinholes 13 of the data storage device 10, are defined in the side plate 32. A shaft 35 is extended from the side plate 32 in the middle portion thereof, and an arc-shaped sliding slot 37 surrounding the shaft 35 is defined in the side plate 32.

Figure 2:
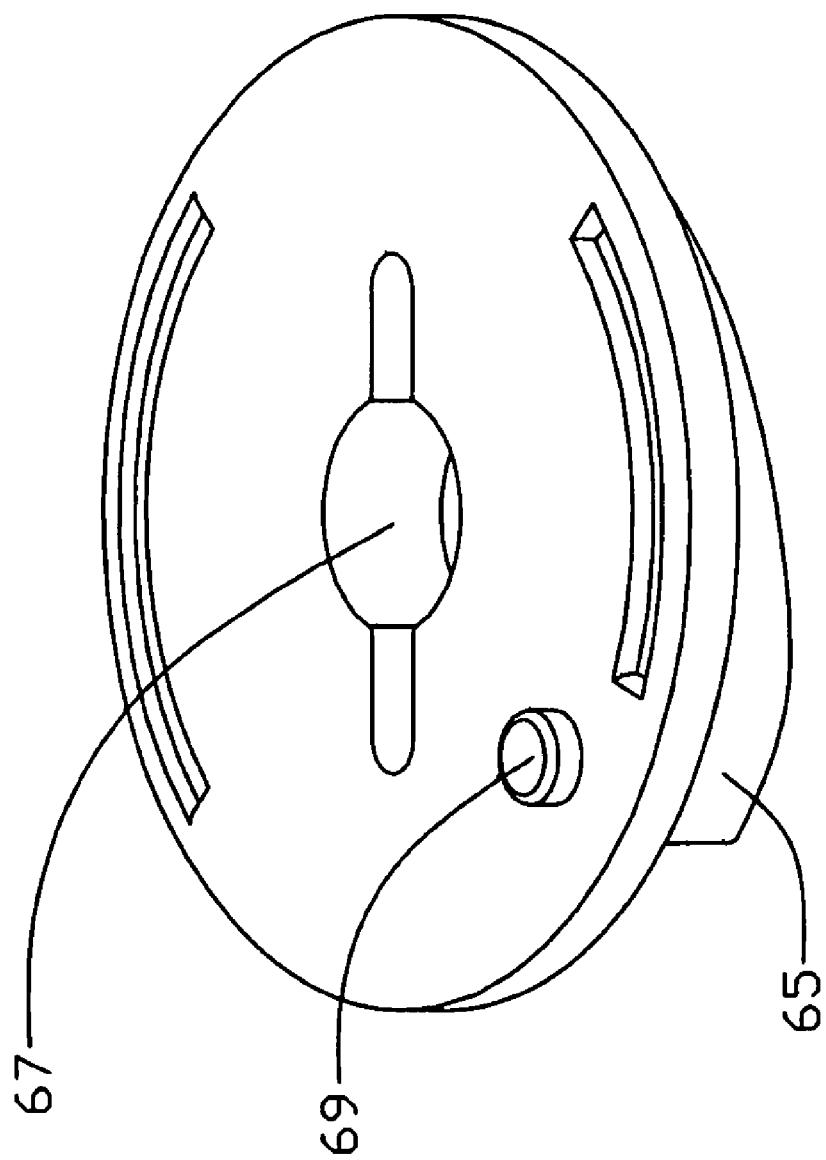
FIG. 2 is an enlarged, isometric view of the rotating member of FIG. 1 viewed from another aspect thereof.

Referring also to FIG. 2, the rectangular fixing member 50 is vertically movable relative to the side plate 32, and comprises a middle plate 52. Two flanges 54 are respectively extended from the middle plate 52 along two opposite side edges thereof. The middle plate 52 cooperates with the two flanges 54 to define a receiving space (not labeled). Each flange 54 defines a fixing hole 57, corresponding to the post 33 of the cage 30. Four attaching pegs 59 corresponding to the mounting apertures 13 in the side plate 32 of the cage 30, are extended form the two flanges 54 of the fixing member 50. Each peg 59 comprises a root 591 sticking up from the flange 54, and a fixing pin 593 is formed at a distal end of the root 591. A round mounting opening 51 is defined in the middle of the middle plate 52. Two arc-shaped guiding slots 53, respectively surrounding the mounting opening 51 are defined in the fixing member 50. A bended tab 55 is formed in close proximity of each guiding slot 53.

The rotating member 60 engaging with the fixing member 50 comprises a round base 61. A protrudent operating handle 63 is formed at a face of the base 61 facing the fixing member 50. Two curved rims 65 surrounding the operating handle 63 are respectively extended from the base 61, corresponding to the guiding slots 53 of the fixing member 50. Each curved rim 65 varies in height, that is, forms a smooth slant top wall (not labeled) gradually raised from the base 61 in a counter-clockwise direction. A top end of each curved rim 65 joins a bottom end of the other curved rim 65 in a circumferential direction. A shaft hole 67 is defined at another face of the base 61, which faces the side plate 32 of the cage 30. A guiding post 69 is extended from the base 61 in close proximity of the shaft hole 67, received in the sliding slot 37 of side plate 32.

Figure 3:
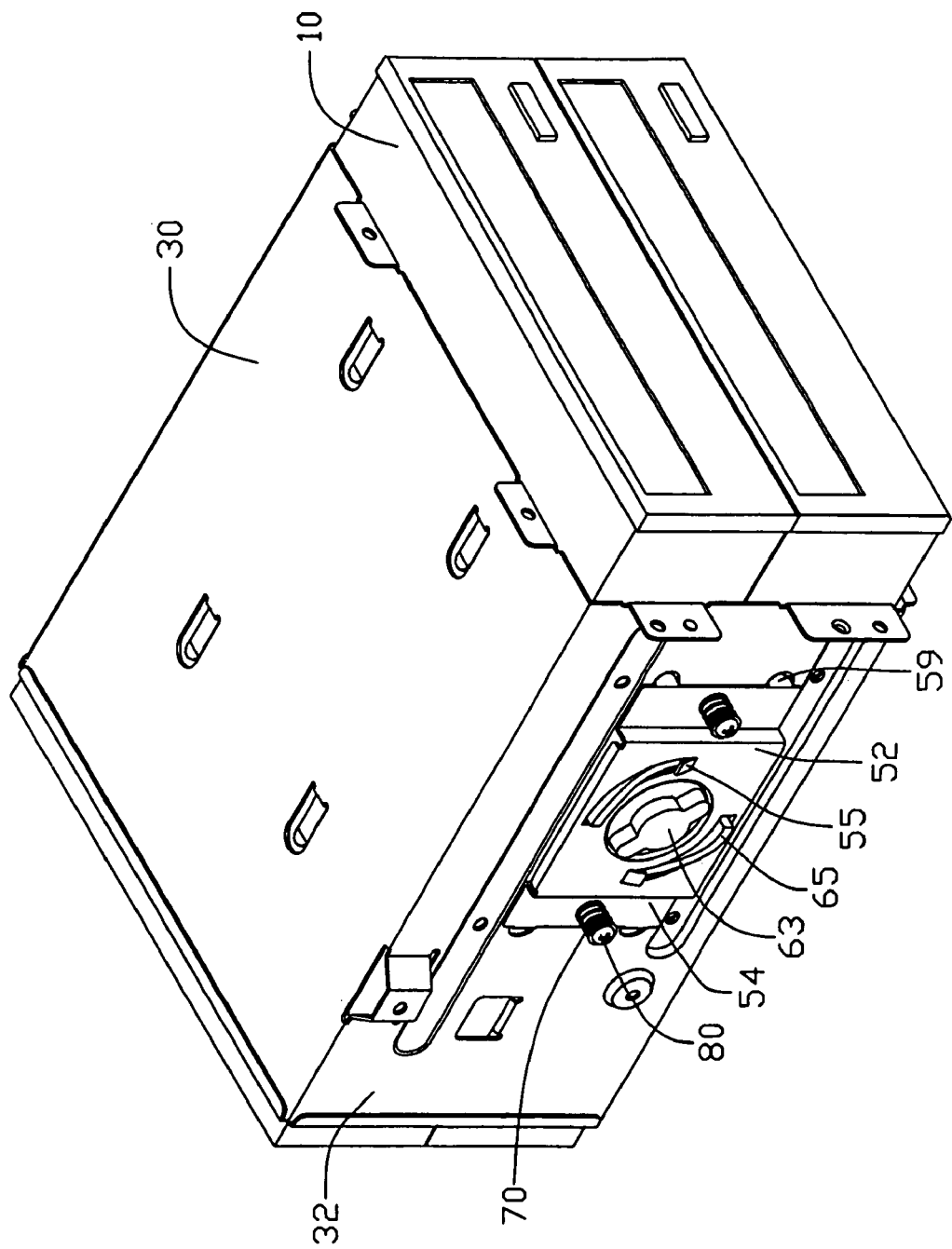
FIG. 3 is an assembled isometric view of the mounting assembly, showing a first assembled relationship.
Figure 4:
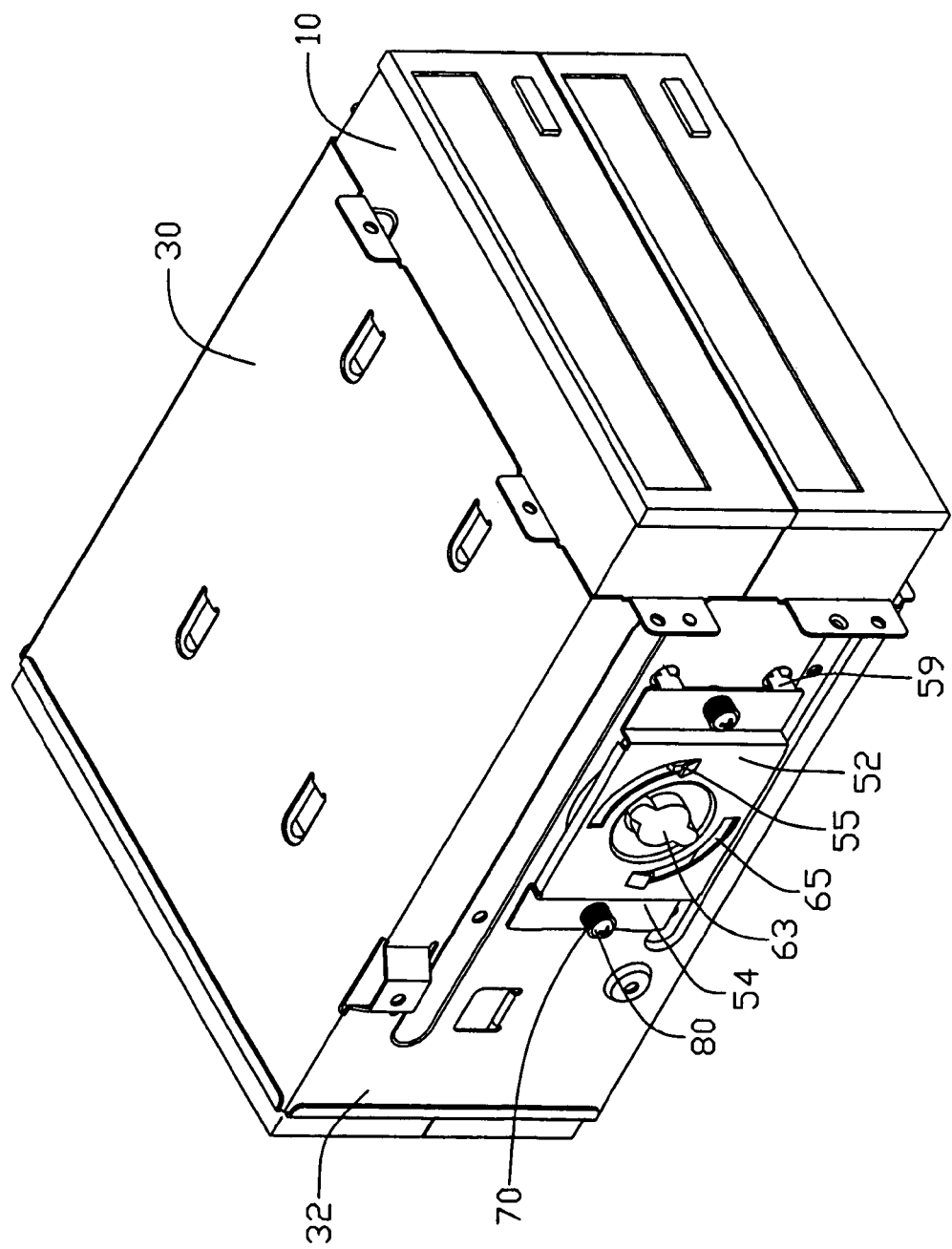
FIG. 4 is an assembled isometric view of the mounting assembly, showing a second assembled relationship.

Referring also from FIG. 3 to FIG. 4, in assembly of the mounting apparatus, when combining the rotating member 60 to the side plate 32, the shaft 35 is received in the shaft hole 67 of the base 61, the guiding post 69 of the base 61 gets through the arc-shaped sliding slot 37, and is rotatable along the sliding slot 37. When combining the fixing member 50 with the cage 30, the pegs 59 align with corresponding mounting apertures 39, the fixing holes 57 of the flanges 54 align with corresponding posts 33 of the side plate 32, the posts 33 get through the fixing holes 57, the curved rims 65 get through the guiding slots 53, and the operating handle 63 stick out from the round mounting opening 51. A elastic member 70, such as a spring or some other resilient member alike, engages with each post 33 having gotten through fixing member 50, an attaching member 80, for example a screw or a rivet, is fixed with each post 33 and simultaneously exerts an initial press on the elastic member 70, thereby the elastic member 70 is previously compressed.

When the curved rims 65 completely stick out from the guiding slots 53, the compressed elastic members 70 reinstate, the fixing member 50 is moved toward the side plate 32 under the reinstating force of the elastic member 70, until the pegs 59 completely penetrate into the mounting apertures 39, this is called a locking location of the rotating member 60. The operating handle 63 is rotated to rotate the rotating member 60, until the top end of each curved rim 65 is blocked under the bended tab 55 of the fixing member 50 in close proximity of the guiding slot 53. The curved rims 65 are gradually rotated under the middle plate 52, the jammed rims 65 push the fixing member 50 to move apart form the side plate 32. When the curved rims 65 are completely rotated under the middle plate 52 from the guiding slots, the pins 593 of the pegs 59 are retreated from the mounting apertures 39 of the side plate 32, this is called a detaching location of the rotating member 60.

In assembly of the data storage device, the data storage device 30 is inserted in the cage 30 and the pinholes 13 of the data storage device 10 align with corresponding mounting apertures 39 of the side plate 32. The rotating member 60 is rotated in a counter-clockwise direction. The curved rims 65 of the rotating member 60 get into the guiding slots 53 gradually from the top end to the bottom end thereof and the elastic member 70 reinstates. When the rotating member 60 rotates to the locking location, the fixing member 50 is attached to the side plate 32 of the cage 30 by the reinstating force of the elastic member 70, simultaneously the pins 593 get through the mounting apertures 39 and received in the pinholes 13 of the data storage device 10, thereby mounting the data storage device to the cage 30.

In disassembly of the data storage device 10, the rotating member 60 is rotated in a clockwise direction. The counter-clockwise raised rims 65 push the fixing member 50 to move apart from the side plate 32 of the cage 30 and compress the elastic members 70. When the rotating member 60 rotates to the detaching location, the elastic member 70 is compressed, simultaneously the fixing member 50 moves apart form the cage 30, and the pins 593 retreat from the pinholes 13 of the data storage device 10, thereby detaching the data storage device from the cage 30.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described

What is claimed is:

1. A mounting assembly for a data storage device defining a plurality of pinholes in a sidewall, comprising:

a cage, adapted for receiving the data storage device, comprising a side plate, the side plate defining a plurality of mounting apertures configured for corresponding to the pinholes of the data storage device;

a fixing member, movable in a direction perpendicular to the side plate, attached to the side plate by an attaching member, an elastic member for pressing the fixing member sandwiched between the attaching member and the fixing member, a plurality of pegs extending from the fixing member, the fixing member defining at least one arc-shaped guiding slot; and a rotating member, being rotatable around an axis perpendicular to the side plate, the rotating member being sandwiched between the side plate and the fixing member, the rotating member comprising at least one rim capable of sticking out from the guiding slot of the fixing member to push the fixing member to move apart from the cage when the rotating member is rotated;

wherein the rotating member pushes or releases the fixing member, the pegs of the fixing member are thereby moved for retreating from the pinholes of the data storage device or being inserted into the pinholes under functions of the elastic member;

wherein the rotating member comprises a base contacting the side plate, and an operating handle protruding away from the side plate from an outer face of the base, the at least one rim is formed on the outer face of the base around the handle in a circumferential direction, and each rim forms a smooth slant top wall gradually raised from the base along said circumferential direction.

2. The mounting assembly as claimed in claim 1, wherein a plurality of interior tabs is inwardly extended from the side plate for supporting the data storage device, a shaft is formed on the side plate, and an arc-shaped sliding slot surrounding the shaft is defined.

3. The mounting assembly as claimed in claim 2, wherein a plurality of posts, each defining a screw hole at a top end, is extended from the side plate, the fixing member defines a plurality of fixing holes corresponding to the posts.

4. The mounting assembly as claimed in claim 3, wherein the rotating member defines a shaft hole receiving the shaft, and forms a guiding post rotating along the sliding slot in close proximity of the shaft at an inner face facing the side plate.

5. The mounting assembly as claimed in claim 1, wherein the fixing member further comprises a raised middle plate, and two flanges respectively offsettingly extend from two opposite edges of the middle plate, the rotating member is received in the raised middle plate, and the elastic member includes two springs pressing the flanges respectively.

6. The mounting assembly as claimed in claim 1, wherein the middle of the fixing member defines a mounting opening for exposing the operating handle.

7. The mounting assembly as claimed in claim 1, wherein a bended tab are formed at an end of the at least one guiding slot of the fixing member.

8. The mounting assembly as claimed in claim 1, wherein the attaching member includes a screw, and the elastic member includes a spring.

9. A mounting assembly for a data storage device defining a plurality of pinholes in a sidewall, comprising:
 a cage, for receiving the data storage device therein, comprising a side plate, the side plate defining a plurality of mounting apertures configured for corresponding to the pinholes in the data storage device;
 a fixing member, movable in a direction perpendicular to the side plate, attached to the side plate by an attaching member, an elastic member establishing a resilient connection between the fixing member and the side plate, a plurality of pegs extending from the fixing member; and
 a rotating member, pivotally engaged with the side plate around an axis perpendicular to the side plate, sandwiched between the side plate and the fixing member, the rotating member comprising a base contacting the side plate, and at least one rim extending up from the base and having various heights relative to the base thereby being capable of pushing the fixing member to move apart from the cage or releasing the fixing member with rotation of the rotating member;
 wherein the rotating member pushes or releases the fixing member, the pegs of the fixing member are thereby moved for retreating from the pinholes of the data storage device or being inserted into the pinholes under functions of the elastic member.

10. The mounting assembly as claimed in claim 9, wherein a plurality of interior tabs is inwardly extended from the side plate for supporting the data storage device, a shaft is formed on the side plate, and an arc-shaped sliding slot surrounding the shaft is defined.

11. The mounting assembly as claimed in claim 10, wherein a plurality of posts, each defining a screw hole at a top end, is extended from the side plate.

12. The mounting assembly as claimed in claim 11, wherein the rotating member defines a shaft hole receiving the shaft, and forms a guiding post rotating along the sliding slot in close proximity of the shaft at an inner face facing the side plate.

13. The mounting assembly as claimed in claim 9, wherein the rotating member comprises an operating handle formed outwardly from an outer face of the base, and exposed from the fixing member, the at least one rim is formed around the handle in a circumferential direction, and each rim forms a smooth slant top wall gradually raised from the base in said circumferential direction.

14. The mounting assembly as claimed in the claim 9, wherein the fixing member further comprises a raised middle plate, and two flanges respectively offsettingly extend from two opposite edges of the middle plate, the rotating member is received in the raised middle plate.

15. The mounting assembly as claimed in the claim 14, wherein the middle plate of the fixing member defines at least one arc-shaped guiding slot for engaging with the at least one rim of the rotating member.

16. The mounting assembly as claimed in the claim 15, wherein a bended tab is formed at an end of the at least one guiding slot of the fixing member.

17. The mounting assembly as claimed in the claim 9, wherein the attaching member includes a screw, and the elastic member includes a spring.

18. A mounting assembly comprising:
 a cage of an electronic apparatus receiving a device therein;
 a rotating member pivotally attached to a side of said cage around an axis perpendicular to said side and pivotable relative to said side of said cage from a first position to a second position; and
 a fixing member movably attached to said side of said cage and sandwiching said rotating member with said side of said cage, and comprising a plurality of pegs extendable into said cage so as to approachably engage with said device in case of moving said rotating member to said first position and disengage from said device in case of moving said rotating member to said second position, wherein said rotating member comprises a curved rim that varies in height, said curved rim approachably engages with said fixing member so as to be contributory to engagement and disengagement of said fixing member with/from said device.

19. The mounting assembly as claimed in claim 18, wherein said fixing member defines an arc-shaped guiding slot therein for receiving the curved rim, the curved rim presses against an end of the guiding slot.

* * * * *